(12) United States Patent
Proefke et al.

(10) Patent No.: US 7,222,006 B2
(45) Date of Patent: May 22, 2007

(54) METHOD FOR DETERMINATION OF PRE-AUTHORIZATION ENGINE OPERATION TIME FOR A VEHICLE THEFT DETERRENT SYSTEM

(75) Inventors: David T. Proefke, Madison Heights, MI (US); Thomas M. Forest, Macomb Township, MI (US); Thomas W. Pfeffer, Messel (DE)

(73) Assignee: General Motors Corporation, Detroit, MI (US)

( * ) Notice: Subject to any disclaimer, the term of this patent is extended or adjusted under 35 U.S.C. 154(b) by 675 days.

(21) Appl. No.: 10/755,949

(22) Filed: Jan. 13, 2004

(65) Prior Publication Data

US 2005/0154511 A1 Jul. 14, 2005

(51) Int. Cl.
*G06F 7/00* (2006.01)
(52) U.S. Cl. ............................ 701/32; 701/31; 701/33; 307/10.3; 307/10.5; 340/426.11
(58) Field of Classification Search .................. 701/32, 701/107, 31, 33; 340/426.11, 426.3, 426.35; 307/10.3, 10.5
See application file for complete search history.

(56) References Cited

U.S. PATENT DOCUMENTS 5,708,307 A * 1/1998 Iijima et al. ................ 307/10.5

6,144,113 A * 11/2000 Hayashi et al. ............ 307/10.5

FOREIGN PATENT DOCUMENTS

DE 004415019 C1 * 4/1995

* cited by examiner

*Primary Examiner*—Thomas Black
*Assistant Examiner*—Brian J. Broadhead
(74) *Attorney, Agent, or Firm*—Laura C. Hargitt

(57) ABSTRACT

Methods and apparatus are provided for determining the duration a motor vehicle engine may operate while operator authorization is verified in response to an ignition request. In one embodiment the method includes the steps of decrementing a pre-authorization timer from a first predetermined time limit and a maximum authorization timer from a second predetermined time limit in response to the ignition request. Also upon receipt of the ignition request an authorization process is initiated. Decrementing of the pre-authorization timer is halted in response to active operation of the starter motor of the motor vehicle, and operation of the motor vehicle is inhibited if either the pre-authorization timer or the maximum authorization timer decrements to zero before completion of the authorization operation.

19 Claims, 2 Drawing Sheets

METHOD FOR DETERMINATION OF PRE-AUTHORIZATION ENGINE OPERATION TIME FOR A VEHICLE THEFT DETERRENT SYSTEM

TECHNICAL FIELD

The present invention generally relates to a motor vehicle security system, and more particularly relates to a motor vehicle theft deterrent engine immobilizer apparatus and method that prevents an unauthorized entity from operating a motor vehicle.

BACKGROUND

In motor vehicle security systems, it is advantageous to have the system regulate the operation of the vehicle's engine in order that the engine operates only if an authorized operator is confirmed to be present. One type of security system, a motor vehicle engine immobilizer system, offers this security by preventing the motor vehicle engine from operating fully unless a valid, electronically-coded, ignition key is provided in the vehicle's ignition lock. Whenever an ignition request is made, the electronics system that governs engine operation checks to make sure a valid ignition key is provided in the vehicle ignition, either through direct communication with the coded ignition key or direct communication with an intermediate theft deterrent module. This process of checking for ignition key validity is referred to throughout the document as the "authentication process." If a valid ignition key is inserted in the ignition, the engine electronics system allows the engine to start and run. If a valid ignition key is not present in the vehicle ignition, the engine electronics system disables engine starting and prevents any further use of the engine until a valid ignition key is provided in the vehicle ignition.

Complex encryption mechanisms are often used by engine immobilizer systems to ensure adequate security for the entire authentication chain, from ignition key to engine management system. Using these complex mechanisms prevent unauthorized users from manipulating the vehicle's electronics system into thinking that a valid ignition key is present in the vehicle ignition. The downside of using such complex mechanisms is that it often takes longer for the vehicle's electronics system to process these codes in order to determine whether or not a user is authorized to use the vehicle. As it is undesirable to have a noticeable pause from the time an ignition key is turned to the "start" position in a vehicle ignition until the time when the vehicle engine actually begins to turn over and start, engine immobilizer systems sometimes allow the vehicle engine to start prior to full user authentication. Allowing the engine to start before completion of the authentication process thus avoids the unwanted time delay. The time period during which the engine is allowed to run, but before user authentication is complete, is known as a "pre-authorization engine operation time." To optimize engine operational requirements, such as those relating to emissions and engine durability, this pre-authorization engine operation time should be set fairly long; but, in the interest of security, to make the engine immobilizer system less prone to security breaches by unauthorized users, it is advantageous to set this time fairly short.

Accordingly, it is desirable to provide a motor vehicle theft deterrent engine immobilizer apparatus and method that prevents an unauthorized entity from operating a motor vehicle but that does so with a high degree of security and without an undue delay in vehicle starting by an authorized user. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for a motor vehicle engine immobilizer security system. In accordance with one embodiment, the apparatus comprises an engine rotational speed sensor configured to monitor rotation of the motor vehicle engine, a starter motor coupled to the motor vehicle engine, fuel injectors capable of controlling fuel flow of a motor vehicle engine, a pre-authorization timer, a maximum authorization timer, an ignition unit configured to receive an ignition key containing authenticating indicia, and memory units configured to store initial start times and current values for the pre-authorization timer and the maximum authorization timer. A controller is configured to initiate an authentication process to determine the authenticity of the authentication indicia and to start decrementing the pre authorization timer and the maximum authorization time in response to a first signal from the ignition unit from the ignition key turning in the ignition unit and to engage the starter motor to start turning the motor vehicle engine in response to a second signal from the ignition unit from the ignition key turning in the ignition unit. The controller is further configured to interrupt the decrementing of the pre-authorization timer in response to the engine rotational speed sensor sensing a rotation speed of the motor vehicle engine greater than zero and less than a predetermined non-zero RPM, and to inhibit starting and fuel injector operation of the motor vehicle engine in response to the decrementing to zero of either the pre-authorization timer or the maximum authorization timer before the authentication process is successfully completed.

A method is provided for determining operator authorization for a motor vehicle in response to an ignition request. In accordance with one embodiment, the method comprises the steps of decrementing a pre-authorization timer from a first predetermined time limit and a maximum authorization timer from a second predetermined time limit in response to the ignition request. Also upon receipt of the ignition request an authentication process is initiated. Decrementing of the pre-authorization timer is halted in response to active starter cranking of the motor vehicle, and operation of the motor vehicle is inhibited if either the pre-authorization timer or the maximum authorization timer decrements to zero before completion of the authentication process.

BRIEF DESCRIPTION OF THE DRAWINGS

The present invention will hereinafter be described in conjunction with the following drawing figures, wherein like numerals denote like elements, and in which FIG. 1 schematically illustrates a theft deterrent engine immobilizer system in accordance with one embodiment of the invention.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In accordance with an embodiment of the invention, a method and apparatus are provided for determining the duration of motor vehicle engine operation during operator authorization. To minimize time delays in the engine startup procedure, the method and apparatus provide a limited time period for vehicle engine operation prior to user authentication being completed. This limited time period during which the starter can crank the engine and during which the engine can operate, but before user authentication is complete, is designated a "pre-authorization engine operation time" or simply a "pre-authorization time." This pre-authorization time is limited to a relatively short predetermined time period in order to avoid unauthorized engine use by subversion of the authentication process as will be explained more fully below. Additionally, the inventive method and apparatus provide that the user authentication process must be completed within a predetermined maximum total authorization time period or vehicle engine operation is prevented.

Figure 1:
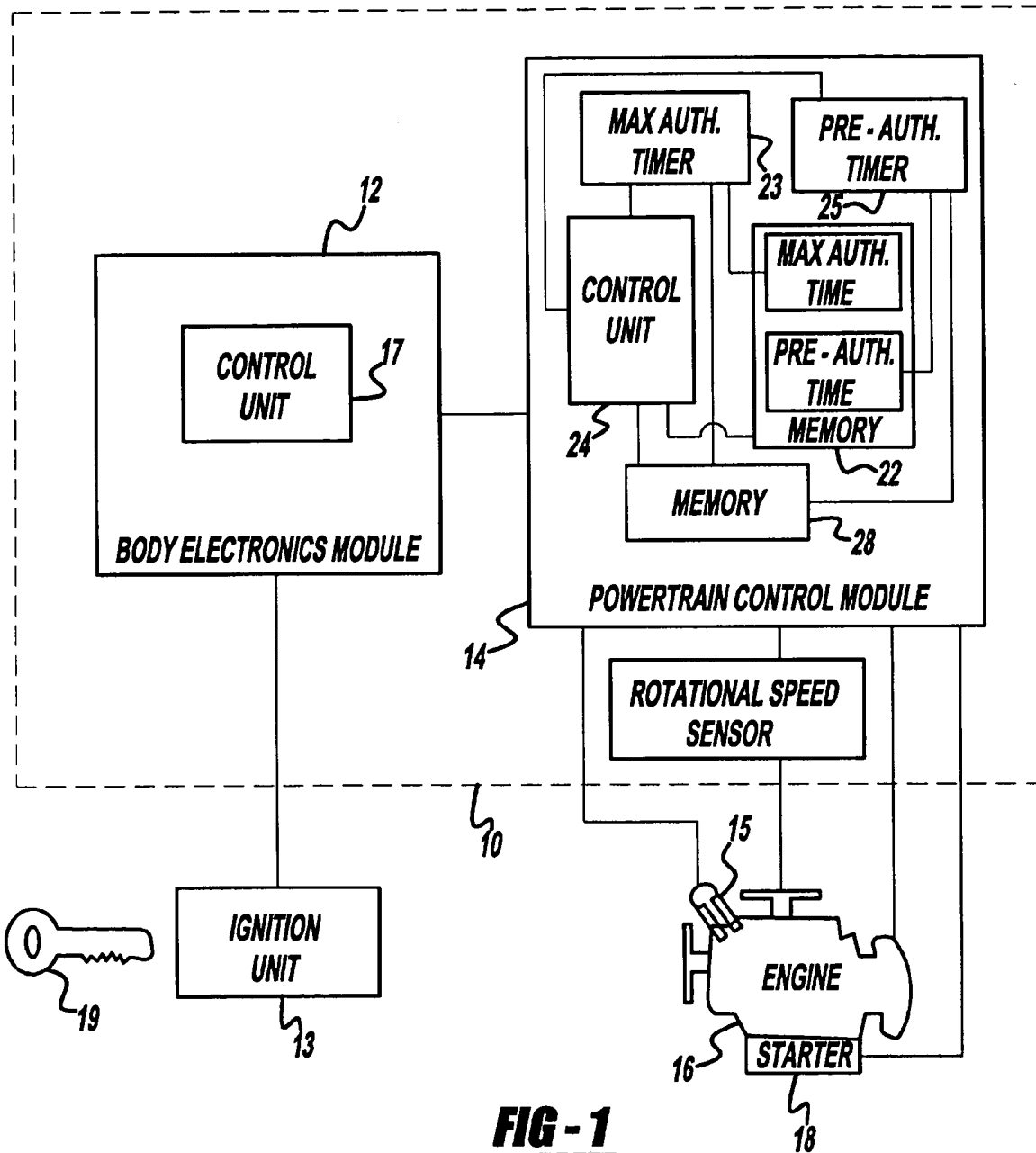

FIG. 1 schematically illustrates an application of an engine immobilizer apparatus 10 in accordance with one embodiment of the invention. Engine immobilizer apparatus 10 includes computer controlled body electronics module 12, computer controlled powertrain control module 14, both of which are configured to communicate over a local area network (LAN) or the like, and engine rotational speed sensor 26. While the preferred embodiment of the invention includes the two specifically identified control modules, the invention may also be embodied in a single control module or may be distributed over a greater number of control modules, whether including the specifically identified control modules or not. In accordance with a preferred embodiment of the invention, powertrain control module 14 includes memory 22, memory 28, a maximum authorization timer 23, pre-authorization timer 25, and control unit 24. Maximum authorization timer 23 and pre-authorization timer 25 can be implemented as adjustable and re-settable timer circuits, software timers, or the like in known manner. Memory 22 stores the available time remaining for the pre-authorization time and the maximum authorization time. Memory 22 is preferably non-volatile memory such as battery-backed RAM memory or the like. Memory 28 stores the predetermined time limits from which timers 23 and 25 count down. Memory 28 is preferably non-volatile FLASH memory or the like. Control unit 24 is further configured to generate a challenge message such as an encrypted message based on a pseudo-random number or the like. Body electronics module 12 includes control unit 17 and is coupled to and is in communication with an ignition unit 13. Control unit 17 is configured to receive a challenge message from control unit 24 and to numerically manipulate the challenge message to generate a response message. The numerical manipulation can include an encryption algorithm, information from ignition unit 13 and key 19, or the like. Control units 24 and 17 may be parts of the engine control computer, separate processors, or the like.

Powertrain control module 14 is configured to communicate with and govern the operation of engine 16 including fuel injectors 15 and engine starter 18 through direct-wired control or the like. Body electronics module 12 is configured to communicate with an ignition unit 13 into which an ignition key 19 can be inserted. Ignition key 19 is configured to contain authenticating indicia that can be interrogated by the security system. The authenticating indicia may be in the form of circuitry, electronic components, or the like. In accordance with one embodiment of the invention, body electronics module 12 is configured to sense a possible ignition request and, upon receipt of such a request, to send a message to powertrain control module 14, initiating the authentication process. An ignition request to which the body electronics module responds may be due to a valid ignition key being placed in ignition unit 13 and turned to the "start" or "on" ignition positions, or may be due to a person trying to hotwire the vehicle or to use a counterfeit key, or the like. In the preferred embodiment of the invention, the message sent to the powertrain control module initiates encrypted authentication of the ignition key 19 to deter an unintended user from circumventing the security system. The timers in the powertrain control module keep track of the time various aspects of the authentication process take, as will be explained more fully below. The powertrain control module uses engine rotational speed sensor 26 to monitor engine rotational speed, as the engine rotational speed is also used in accordance with one embodiment of the invention. The powertrain control module receives an encoded message sent by the body electronics module which contains the result of the authentication process. The powertrain control module then carries out steps necessary in order to determine whether or not the authentication is successful. These steps include, for example, using an encryption algorithm and the transmitted pseudo-random challenge to calculate an expected response and comparing the received result from the body electronics module to the expected result in known manner and referred to herein as an "authentication process." If the authentication process "succeeds," it means the powertrain control module has determined that a valid vehicle operator is present.

In a preferred embodiment of the invention, when an ignition key is inserted in ignition unit 13 and turned to the "on" position, the body electronics module 12 initializes and communicates the change in ignition status to the powertrain control module 14. The powertrain control module then initializes and sets an engine operation command stored in memory 22 to "enabled". As long as the engine operation command is enabled, the vehicle engine is allowed to start and run. If the engine operation command is set to "disabled", fuel injectors 15 are not allowed to operate, thereby preventing the vehicle engine from starting or running. Upon receipt of the ignition status information from the body electronics module, the powertrain control module transmits a coded message to the body electronics module, initiating the authentication process. The powertrain control module then begins decrementing both maximum authorization timer 23 and pre-authorization timer 25. The default time limits that both these timers count down from are stored in memory 28. If the ignition key 19 is further rotated in ignition unit 13 to the "start" position, the body electronics module will communicate this changed ignition status to the powertrain control module. At this time engine starter 18, because the engine operation command is set to "enabled", becomes operational and begins turning engine 16. Powertrain control module 14, sensing through engine rotational speed sensor 26 that the engine is turning, stops decrementing pre-authorization timer 25. The pre-authorization timer is stopped because the power drawn by the starter motor may cause the voltage level within the electrical system to drop to a voltage that is too low to sustain the necessary communication between control modules. Sensing engine rotation is an indirect method to monitor starter operation and system voltage as well as the progress in starting the engine. Although the pre-authorization timer is interrupted, maximum authorization timer 23 continues to decrement. The authentication process continues unless system voltage drops too low (due to the starter draw during engine starting) to sustain the authentication process. If the authentication process is interrupted, the maximum authorization timer continues to count down. The authentication process resumes when system voltage becomes sufficient to allow the necessary communication to complete the authentication process. As soon as the powertrain control module senses, in response to a signal from the engine rotational speed sensor, that the starter motor has stopped turning the engine and that the engine is turning under its own power, the powertrain control module resumes decrementing the pre-authorization timer. If either the pre-authorization timer or the maximum authorization timer decrements to zero, the engine authorization command is set to "disabled" and vehicle operation is inhibited. If instead the powertrain control module determines that the authentication process has successfully concluded, before either the pre-authorization timer or the maximum authorization timer expires, the engine authorization command is set to "enabled," normal vehicle operation is permitted, and the powertrain control module resets the pre-authorization timer for the next vehicle use event and the security process becomes inactive.

Figure 2:
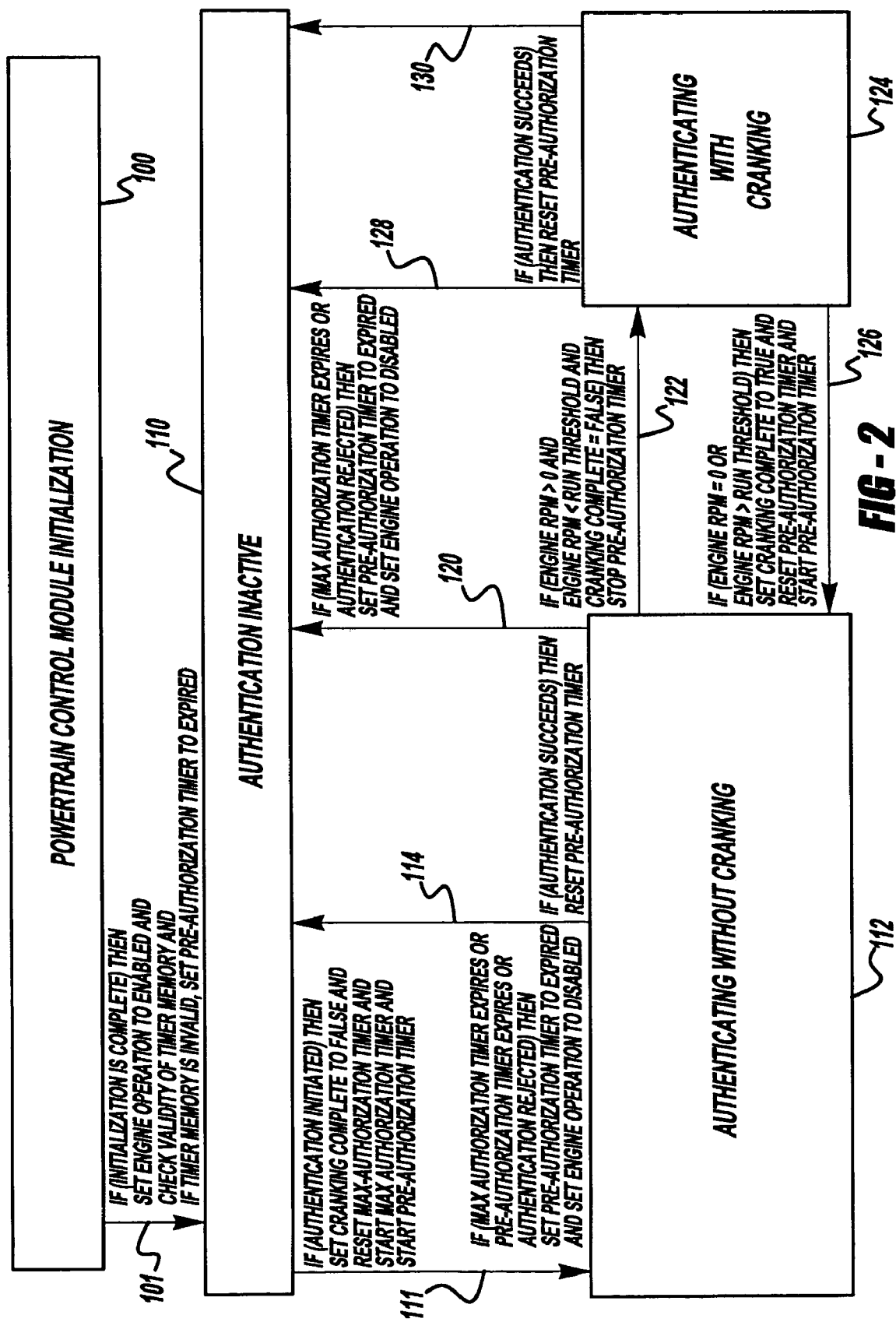
FIG. 2 schematically illustrates a security method in accordance with an embodiment of the invention in state chart form.

The security method for using a motor vehicle theft deterrent engine immobilizer system in accordance with an embodiment of the invention is illustrated in FIG. 2 with continued reference to FIG. 1. When body electronics module 12 senses that an ignition request is being made, a signal is communicated to powertrain control module 14, causing control unit 24 to initialize (step 100) and set the engine operation command, stored in memory 22, to "enabled" (step 101). Only when the engine operation command is set to "enabled" does the powertrain control module allow engine starter 18 to function and engine fueling to occur. At this time (step 101), the powertrain control module also checks the available time for the pre-authorization timer stored in memory 22 to see if the memory has been tampered with. If memory 22 is invalid, indicating that the memory has been tampered with and that a possible attempt at unauthorized use has been made, the powertrain control module sets the pre-authorization timer value to expire. With the pre-authorization timer set to expired, engine starting cannot proceed until the authentication process has been completed and the user has been authenticated as a valid user. If memory 22 has not been tampered with, then the pre-authorization timer time limit value remains the value currently stored in the memory. This time limit value might be expired, if an unauthorized user made the previous ignition request, or it might be the pre-determined time limit (500 milliseconds, for example), if an authorized user made the previous ignition request. The authentication process is then inactive (step 110) awaiting initiation.

After powertrain control module 14 checks memory 22 and determines it to be valid, the powertrain control module initiates the authentication process by sending a pseudo-randomly generated challenge message to the body electronics module. Control unit 17 of the body electronics module, upon receiving this message, uses this challenge, as well as the results of its interrogation of ignition key 19, as inputs to an encryption algorithm to generate a response to the challenge. Powertrain control module 14 also sets the engine cranking complete command, stored in memory 22, to "false". The engine cranking complete command refers to whether or not the engine starter has been used in an attempt to start the vehicle engine and whether or not that process has been completed. Powertrain control module 14 resets the maximum authorization timer time value to a default value (ten seconds, for example) stored in memory 28 and begins decrementing both maximum authorization timer 23 and pre-authorization timer 25 (step 111). The time value of the maximum authorization timer depends on many variables, including but not limited to, the complexity of the encryption process, the length of time to communicate the results of the encryption process, and the length of time nominally required to start engine 16. As timers 23 and 25 decrement, control unit 24 continuously updates the current maximum authorization time and the current pre-authorization time stored in memory 22.

In accordance with one embodiment of the invention, authentication proceeds along two interrelated paths, "authentication without engine cranking" (step 112) and "authentication with engine cranking" (step 124). The powertrain control module enters the "authenticating without engine cranking" stage (step 112) when an ignition request is first made. If, at any point during the authenticating without engine cranking stage pre-authorization timer 25 expires (counts down to zero), the powertrain control module sets the pre-authorization timer time value to "expired" in memory 28 and sets the engine operation command stored in memory 22 to "disabled" (step 114). This prevents engine operation until the authentication process is successfully completed. After the pre-authorization timer expires, the authentication process continues until either the authentication process succeeds, in which case the control unit resets the engine operation command stored in memory 22 to "enabled" (step 120), authentication process fails (step 114), or the ignition request for vehicle operation is removed. Whether or not the pre-authorization timer has previously expired during a particular ignition request, if maximum authorization timer 25 expires before the authentication process is completed, or if the authentication process fails (indicating that either the body electronics module or powertrain control module has determined operator authority is invalid) (step 114), the powertrain control module sets the pre-authorization timer value to "expired" in memory 22 and sets the engine operation command stored in memory 22 to "disabled" (step 114), thereby preventing any engine activity. The engine immobilizer system then inactivates the authentication process (step 110) until control unit 24 determines that a new authentication cycle is warranted. In the case of failed or delayed authentication in step 114, the next time an ignition request is made, the pre-authorization timer is already set to "expired." Because the pre-authorization timer is set to "expired," the engine operation command is immediately set to "disabled" once the authentication process takes place; thus, the next engine start is delayed until after the full authentication process takes place. This prevents an unauthorized user from attempting to bypass the security system, for example by repeatedly turning the vehicle on and off and using the starter motor to achieve some operational vehicle speed. This also prevents an unauthorized operator from bypassing the security system by tampering with the engine rotational speed sensor 26 to trick powertrain control module 14 into thinking an operating engine is not actually operating. Due also to step 114, if a previous ignition request set the pre-authorization timer to "expired," engine operation is not enabled until the powertrain control module completes the full authentication process.

During the authenticating without engine cranking stage, if the authentication process succeeds before either the pre-authorization timer or the maximum authorization timer expires, the powertrain control module resets the pre-authorization timer time value in memory 22 to the pre-determined value stored in memory 28 (step 120), leaves the engine control operation command in memory 22 set to "enabled," and the vehicle engine is allowed to start and run for the remainder of the ignition cycle. Because of the successful authentication and the resetting of the preauthorization timer to its default value, upon the next ignition request, authentication will proceed normally because the engine operation command is not immediately set to "disabled" as described above. After step 120 is completed, the authentication process becomes inactive (step 110).

If, at any time during the authenticating without engine cranking stage powertrain control module 14 senses, in response to engine rotational speed sensor 26, that engine rotational speed is between zero revolutions per minute (RPM) and some pre-determined rotational threshold (400 RPM, for example), and the cranking complete command is currently set to "false" (step 122), the powertrain control enters the "authentication with engine cranking" stage (step 124). When the powertrain control module enters this stage, the module temporarily stops decrementing the pre-authorization timer but continues decrementing the maximum authorization timer. The maximum authorization timer continues decrementing so that the total time allowed for full engine operation before authorization is bounded. This prevents, for example, an unauthorized user from disabling or tampering with the engine speed sensor so as to allow extended engine operation in the authentication with engine cranking stage. If, during the authentication with engine cranking stage, the engine RPM rises above the pre-determined threshold, the powertrain control module sets the cranking complete command stored in memory 22 to "true," resets the pre-authorization timer to its default time limit, begins decrementing the pre-authorization timer (step 126), and returns to the authorization without cranking stage (step 112). Alternatively, if, during the authentication with engine cranking stage, the engine RPM drops to zero, the powertrain control module also sets the engine cranking complete command stored in memory 22 to "true", resets the pre-authorization timer to its default time limit, begins decrementing the pre-authorization timer (step 126), and returns to the authorization without engine cranking stage. Either cause for returning to the authenticating without engine cranking stage results from the engine rotational speed indicating that engine starter 18 is no longer turning engine 16. By setting the cranking complete to "true" and resetting and restarting the pre-authorization timer, the powertrain control module prevents unauthorized users from gaining continued use of the vehicle engine without having the pre-authorization timer expire. The authenticating with engine cranking stage, in which the pre-authorization timer is stopped, can only be entered if the cranking complete command is set to "false." If, during the authenticating with engine cranking stage the authentication process succeeds, the powertrain control module resets the pre-authorization timer time value in memory 22 to the default value stored in memory 28 and maintains the engine control operation command as "enabled" (step 130). After step 130 is completed, the authentication process becomes inactive (step 110).

In accordance with one embodiment of the invention (not illustrated), if current drain by the starting system causes the vehicle voltage to drop too low to sustain communication between the body electronics module and the powertrain control module or otherwise causes the engine immobilizer system to be unable to properly function, the authentication process is suspended, but the powertrain control module does not stop decrementing the maximum authorization timer. The interruption in authentication can be implemented if vehicle voltage drops below some predetermined value (for example, 5 volts). Once the system voltage recovers to a value where authentication is possible (for example, 7 volts), the authentication process resumes, and the maximum authorization timer continues to decrement from the value stored in memory 22.

If the maximum authorization timer expires or if the authentication process fails (step 128), the powertrain control module sets the pre-authorization timer value to expired and sets the engine operation command to "disabled", thereby shutting off the engine. Engine operation is initially inhibited the next time there is an ignition request because the pre-authorization timer is set to "expired" and the engine operation command is immediately set to "disabled" as soon as step 111 occurs. If the authentication process succeeds, the powertrain control module resets the pre-authorization timer time value in memory 22 to the default value stored in memory 28 and causes the powertrain control module to set the engine control operation command to "enable" (step 120). After step 120 is completed, the authentication process becomes inactive (step 110).

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

What is claimed is:

1. A method for determining the duration a motor vehicle engine may operate during operator authorization for a motor vehicle, the method comprising the steps of:
    decrementing a pre-authorization timer from a first predetermined time limit and a maximum authorization timer from a second predetermined time limit in response to an ignition request;
    initiating an authentication operation;
    halting the decrementing of the pre-authorization timer in response to active operation of the motor vehicle's starter motor; and
    inhibiting operation of the motor vehicle if either the pre-authorization timer or the maximum authorization timer decrements to zero before completion of the authentication operation.

2. A method for determining the duration a motor vehicle engine may operate during operator authorization for a motor vehicle in response to an ignition request, the method comprising the steps of:
    setting a pre-authorization timer to a first predetermined time;
    setting a maximum authorization timer to a second predetermined time;

decrementing of each of the pre-authorization timer and the maximum authorization timer;

initiating an authentication process;

initiating starter operation to start the motor vehicle engine;

monitoring rotational speed of the motor vehicle engine;

interrupting the step of decrementing the pre-authorization timer in response to monitoring the rotational speed being greater than zero and less than a predetermined rotational speed;

interrupting the step of decrementing the pre-authorization timer in response to interruption of the vehicle ignition request;

restarting the step of decrementing the preauthorization timer in response to monitoring the rotational speed being greater than the predetermined rotational speed or being zero; and allowing continued operation of the motor vehicle only after successful completion of the authentication process and terminating operation of the motor vehicle engine in response to either of the pre-authorization timer or the maximum authorization timer decrementing to zero before the authentication process is successfully completed.

3. The method of claim 2 further comprising the steps of:

storing the first predetermined time and the second predetermined time in a non-volatile memory;

storing the remaining time available for the pre-authorization timer and maximum authorization timer in a non-volatile memory; and checking the memory to insure that the memory has not been tampered.

4. The method of claim 3 further comprising the step of terminating operation of the motor vehicle engine until successful completion of the authentication process if the memory has been tampered with.

5. The method of claim 4 wherein the step of terminating operation comprises the step of setting the pre-authorization timer to zero.

6. The method of claim 3 further comprising the step of resetting the pre-authorization timer to the first predetermined time in response to a successful completion of the authorization operation.

7. Apparatus for motor vehicle engine immobilizer security system comprising: a motor vehicle engine; an engine rotational speed sensor configured to monitor rotational speed of the motor vehicle engine; a starter motor coupled to the motor vehicle engine;

a pre-authorization timer;

a maximum authorization timer;

an ignition unit configured to receive an ignition key containing authenticating indicia;

a memory unit configured to store initial start times for the preauthorization timer and for the maximum authorization timer;

a controller configured to:

initiate an authorization operation to determine the authenticity of the authentication indicia and to start decrementing the pre authorization timer and the maximum authorization time in response to a first signal from the ignition unit from the ignition key turning in the ignition unit;

engage the starter motor to start turning the motor vehicle engine in response to a second signal from the ignition unit from the ignition key turning in the ignition unit;

interrupt the decrementing of the pre-authorization timer in response to the engine rotational speed sensor sensing a rotational speed of the motor vehicle engine greater than zero and less than a predetermined non-zero RPM; and inhibit starting and operation of the motor vehicle engine in response to the decrementing to zero of either the pre-authorization timer or the maximum authorization timer before the authorization operation is completed.

8. The apparatus of claim 7 further comprising fuel injectors configured to manage flow of fuel to the engine and wherein the controller is further configured to enable operation of fuel injectors to allow motor vehicle fuel flow in response to the first or second signals from the ignition unit from the ignition key turning in the ignition unit.

9. The apparatus of claim 7 wherein the controller is further configured to reset the pre-authorization timer to an initial state of zero in response to a failed authorization operation.

10. The apparatus of claim 7 wherein the controller is further configured to reset the pre-authorization timer to an initial state of zero in response to determining that the memory has been corrupted.

11. The apparatus of claim 7 wherein the controller comprises a body electronics module and a powertrain control module.

12. The apparatus of claim 11 wherein the powertrain control module is configured to communicate with and control the motor vehicle engine and the starter motor.

13. The apparatus of claim 11 wherein the body electronics module is coupled to receive the first and second signals from the ignition unit.

14. A motor vehicle engine immobilizer security apparatus configured to limit operation of a motor vehicle and to allow continued operation of an engine of the motor vehicle only to authorized users, the apparatus comprising:

a first control module configured to receive and communicate ignition requests from an ignition unit; and a second control module configured to control starting and operation of an engine of the motor vehicle and to perform an authorization operation in response to a message received from the first control module; the second control module comprising a pre-authorization timer, a maximum authorization timer, and a memory configured to store a predetermined time limit for each of the pre-authorization timer and the maximum authorization timer, the pre-authorization timer and the maximum authorization timer configured to begin decrementing upon receipt of the ignition request; and the second control module configured to inhibit engine operation if either of the pre-authorization timer or the maximum authorization time decrements to zero before completion of the authorization operation.

15. A method for determining operator authorization for a motor vehicle in response to an ignition request to start the engine of the motor vehicle, the method comprising the steps of:

setting a first time, limit for authorization of an operator and decrementing a first timer from the first time limit;

initiating an authorization operation;

initiating starting of the engine of the motor vehicle;

interrupting the decrementing of the first timer in response to monitoring a rotational speed of the engine exceeding 0 RPM but less than a predetermined RPM;

setting a second time limit to a maximum time limit for authorization of an operator and decrementing a second timer from the second time limit; and inhibiting continued operation of the motor vehicle if the authorization operation is not completed before either of the first timer or the second timer decrements to zero.

16. The method of claim 15 further comprising the steps of:
storing the first time limit and the second time limit in a non-volatile memory.

17. The method of claim 15 further comprising the steps of:
storing the current status of the first timer and the second timer in battery backed memory; and checking the memory to determine whether the memory has been corrupted.

18. The method of claim 17 further comprising the step of resetting the first timer to zero in response to determining that the memory has been corrupted.

19. The method of claim 15 further comprising the step of resetting and restarting decrementing of the first timer in response to monitoring the speed of rotation of the engine exceeding the predetermined RPM or being zero.

* * * * *